US011130511B2

(12) United States Patent
Abohammdan et al.

(10) Patent No.: US 11,130,511 B2
(45) Date of Patent: Sep. 28, 2021

(54) LIGHT WEIGHT PICK CART

(71) Applicant: Walmart Apollo, LLC, Bentonville, AR (US)

(72) Inventors: Tawfeek Abohammdan, Bentonville, AR (US); Jeff Green, Bentonville, AR (US); Paul Durkee, Centerton, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 16/513,975

(22) Filed: Jul. 17, 2019

(65) Prior Publication Data

US 2020/0039553 A1 Feb. 6, 2020

Related U.S. Application Data

(60) Provisional application No. 62/713,953, filed on Aug. 2, 2018.

(51) Int. Cl.
*B62B 3/02* (2006.01)
*B62B 5/06* (2006.01)
*B62B 3/00* (2006.01)
*B62B 5/04* (2006.01)

(52) U.S. Cl.
CPC ............. *B62B 3/005* (2013.01); *B62B 3/02* (2013.01); *B62B 5/0466* (2013.01); *B62B 5/06* (2013.01)

(58) Field of Classification Search
CPC .......... B62B 3/005; B62B 3/02; B62B 3/027; B62B 3/04; B62B 5/0466; B62B 5/06

USPC .................................................. 280/651
See application file for complete search history.

(56) References Cited

U.S. PATENT DOCUMENTS

| 4,165,088 | A | 8/1979 | Nelson |
| 4,986,555 | A | 1/1991 | Andreen |
| 5,887,878 | A * | 3/1999 | Tisbo ............. B62B 1/20 280/47.19 |
| 5,947,494 | A | 9/1999 | Thogersen et al. |
| 6,095,348 | A | 8/2000 | Karashima |
| 6,997,382 | B1 | 2/2006 | Bhri |

(Continued)

OTHER PUBLICATIONS

Young, Lee W., "International Search Report", International Application No. PCT/US2019/042136, dated Oct. 10, 2019, 3 pages.

(Continued)

*Primary Examiner* — John D Walters (57) ABSTRACT

Various configurations of light weight pick carts are disclosed; some embodiments may alternate between a first configuration having two shelf racks and a second configuration having both a shelf rack and a flatbed. A first shelf rack has multiple accessory support units attached, having multiple different configurations to facilitate holding differing shapes, sizes, or weights of accessories. Swivel casters and multiple handle locations can enhance maneuverability; and proper selection of material and use of perforation and wire frames may reduce weight to ease operation. For stability, a removable second shelf rack may engage the first shelf rack using hooks, while a removable flatbed unit may engage the first shelf rack using notches. The second shelf rack provides more discrete storage locations, while the flatbed permits transportation of larger or heavier items. This versatility enhances the utility of the cart.

16 Claims, 7 Drawing Sheets

(56) References Cited

U.S. PATENT DOCUMENTS

| | | | |
|---|---|---|---|
| 7,857,329 B2* | 12/2010 | Cai | B62B 3/04 |
| | | | 280/47.35 |
| 9,211,900 B2* | 12/2015 | Knepp | B62B 3/08 |
| 9,622,574 B2 | 4/2017 | Kabacinski et al. | |
| D793,644 S | 8/2017 | Walter et al. | |
| 9,719,294 B2 | 8/2017 | Abel et al. | |
| 9,994,244 B2* | 6/2018 | Churchvara | B62B 3/005 |
| 10,137,916 B1* | 11/2018 | Glassberg | B62B 3/02 |
| 2003/0155731 A1* | 8/2003 | Ditges | B62B 3/004 |
| | | | 280/47.35 |
| 2008/0084036 A1 | 4/2008 | Keeler | |
| 2008/0302585 A1* | 12/2008 | Perelli | B62B 5/0076 |
| | | | 180/14.1 |
| 2011/0266078 A1 | 11/2011 | Hupke | |
| 2012/0134771 A1* | 5/2012 | Larson | B65D 19/42 |
| | | | 414/800 |
| 2013/0240472 A1* | 9/2013 | Preidt | A47F 5/0093 |
| | | | 211/153 |
| 2013/0313029 A1 | 11/2013 | Franco | |
| 2015/0344052 A1 | 12/2015 | McClanahan et al. | |
| 2017/0356539 A1 | 12/2017 | Lai et al. | |
| 2018/0057033 A1* | 3/2018 | Green | B62B 3/1412 |

OTHER PUBLICATIONS

Young, Lee W., "Written Opinion", International Application No. PCT/US2019/042136, dated Oct. 10, 2019, 9 pages.

Unknown, "Material Handling Idea Book," Newage Industrial, Jan. 1, 2019, 88 pages.

Unknown, "Warehouse Accessories," Rack Systems Inc., https://racksystemsinc.com/warehouse-accessories/, accessed Jul. 6, 2019, 26 pages.

Unknown, "Product Catalog 2017 Picking Carts," National Cart Co, Jan. 2017, 26 pages.

\* cited by examiner

LIGHT WEIGHT PICK CART

BACKGROUND

When customers order items for pick up or delivery, the items must be pulled from stock and staged. This may involve someone going through a storage area, retrieving the items, and placing them into a pick cart. A pick cart may also be used to return unclaimed items to stock. In some situations, the items to collect or distribute may comprise a widely varying set of different, but yet relatively small and light weight products. A cart used for such a task may have a number of bins, stacked in shelves. At other times, one or more of the items may be too heavy or bulky to fit easily within a bin on a shelf, and a flatbed cart is preferable.

SUMMARY

Various configurations of light weight pick carts are disclosed; some embodiments may alternate between a first configuration having two shelf racks and a second configuration having both a shelf rack and a flatbed. A first shelf rack has multiple accessory support units attached, having multiple different configurations to facilitate holding differing shapes, sizes, or weights of accessories. Swivel casters and multiple handle locations can enhance maneuverability; and proper selection of material and use of perforation and wire frames may reduce weight to ease operation. For stability, a removable second shelf rack may engage the first shelf rack using hooks, while a removable flatbed unit may engage the first shelf rack using notches. The second shelf rack provides more discrete storage locations, while the flatbed permits transportation of larger or heavier items. This versatility enhances the utility of the cart.

Some exemplary embodiments of a light weight pick cart may comprise: a frame comprised of aluminum; a first shelf rack comprised of aluminum and attached to the frame, the first shelf rack having at least two pairs of vertical members and at least three vertical shelf divisions, wherein a top shelf of the first shelf rack provides a perforated flat surface; a second shelf rack comprised of aluminum and attached to the frame, the second shelf rack having at least two pairs of vertical members and at least three vertical shelf divisions, wherein a top shelf of the second shelf rack provides a perforated flat surface; a first handle attached to the frame through a first pair of the two pairs of vertical members of the first shelf rack, wherein the first handle is curved in at least two dimensions; a pair of secondary handles, each of the of secondary handles disposed on one vertical member of a second pair of the two pairs of vertical members of the first shelf rack, wherein each of the of secondary handles is curved in at least one dimension; at least five accessory support units attached to the first shelf rack, the five accessory support units having at least three different configurations, wherein at least one of the five accessory support units comprises a flat shelf having at least one hole, wherein at least one of the five accessory support units comprises a basket, wherein at least one of the five accessory support units comprises a first hook of a first size and disposed in a first orientation, and wherein at least one of the five accessory support units comprises a second hook differing from the first hook in either size or orientation; at least four wheels attached to the frame, each of the four wheels disposed nearby a corner of the frame, wherein at least two wheels of the four wheels comprise swivel casters.

Some exemplary embodiments of a light weight pick cart may comprise: a frame; a first shelf rack attached to the frame, the first shelf rack having at least two pairs of vertical members and at least three vertical shelf divisions, wherein a top shelf of the first shelf rack provides a flat surface; a first handle attached to the frame; at least five accessory support units attached to the first shelf rack, the five accessory support units having at least three different configurations; at least four wheels attached to the frame, each of the four wheels disposed nearby a corner of the frame, wherein at least two wheels of the four wheels comprise swivel casters; a removable second shelf rack, the second shelf rack having at least two pairs of vertical members and at least three vertical shelf divisions, wherein a top shelf of the second shelf rack provides a flat surface; and a removable flatbed unit, wherein the second shelf rack and the flatbed unit may alternately attach to the frame adjacent to the first shelf rack such that the cart is convertible between a first configuration having two shelf racks and a second configuration having both a shelf rack and a flatbed.

Some exemplary methods for converting a light weight convertible pick cart between a first configuration having two shelf racks and a second configuration having both a shelf rack and a flatbed may comprise: responsive to the cart being in the first configuration: disengaging hooks of a second shelf rack from a first shelf rack; disengaging the second shelf rack from a frame of the cart; removing the second shelf rack from the cart; engaging notches of a flatbed unit with first shelf rack; and engaging the flatbed unit with the frame of the cart; and responsive to the cart being in the second configuration: disengaging the flatbed unit from the frame of the cart; disengaging the notches of the flatbed unit from the first shelf rack; removing the flatbed unit from the cart; engaging the second shelf rack with the frame of the cart; and engaging the hooks of the second shelf rack with the first shelf rack.

Alternatively, or in addition to the other examples described herein, examples include any combination of the following: the top shelf of the first shelf rack and the top shelf of the second shelf are perforated; the first handle is attached to the frame through a first pair of the two pairs of vertical members of the first shelf rack; the first handle is curved in at least two dimensions; a pair of secondary handles, each of the of secondary handles disposed on one vertical member of a second pair of the two pairs of vertical members of the first shelf rack, wherein each of the of secondary handles is curved in at least one dimension; at least one of the five accessory support units comprises a flat shelf having at least one hole; at least one of the five accessory support units comprises a basket; the basket comprises a wire frame basket; at least one of the five accessory support units comprises a first hook of a first size and disposed in a first orientation; at least one of the five accessory support units comprises a second hook differing from the first hook in either size or orientation; at least four wheels comprise swivel casters; at least two of the swivel casters are lockable to prevent swiveling; a fifth wheel disposed on a first long edge of the frame and a sixth wheel disposed on a second long edge of the frame, opposite the first long edge of the frame; the second shelf rack comprises a pair of hooks, each of the hooks disposed on one vertical member of a first pair of the two pairs of vertical members of the second shelf rack; the first shelf rack comprises a pair of slots, each of the slots disposed on one vertical member of a second pair of the two pairs of vertical members of the first shelf rack, wherein each of the slots is configured to engage one of the hooks of the second shelf rack; the flatbed unit comprises a pair of notches, each of the notches configured to engage one vertical member of a second pair of the two pairs of vertical members of the first shelf rack; the weight of the cart in the first configuration is below 150 pounds; the frame, the first shelf rack, and the second shelf rack are comprised of aluminum.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

A more detailed understanding may be obtained from the following description, presented by way of example, in conjunction with the accompanying drawings. The entities, connections, arrangements, and the like that are depicted in, and in connection with the various figures, are presented by way of example and not by way of limitation. As such, any and all statements or other indications as to what a particular figure depicts, what a particular element or entity in a particular figure is or has, and any and all similar statements, that may in isolation and out of context be read as absolute and therefore limiting, may only properly be read as being constructively preceded by a clause such as 'In at least some embodiments, . . . For brevity and clarity of presentation, this implied leading clause is not repeated ad nauseum.

When customers order items for pick up or delivery, the items must be pulled from stock and staged. This may involve someone going through a storage area, retrieving the items, and placing them into a pick cart. A pick cart may also be used to return unclaimed items to stock. In some situations, the items to collect or distribute may comprise a widely varying set of different, but yet relatively small and light weight products. A cart used for such a task may have a number of bins, stacked in shelves. At other times, one or more of the items may be too heavy or bulky to fit easily within a bin on a shelf, and a flatbed cart is preferable. At other times, there may be a combination of a smaller and lighter items along with bulkier or heavier items to either collect or return to stock. It may thus be advantageous, in some situations, to have a cart that can be adapted to the different use cases.

Some embodiments of a light weight pick cart may alternate between a first configuration having two shelf racks and a second configuration having both a shelf rack and a flatbed. A first shelf rack has multiple accessory support units attached, having multiple different configurations to facilitate holding differing shapes, sizes, or weights of accessories. Swivel casters and multiple handle locations can enhance maneuverability; and proper selection of material and use of perforation and wire frames may reduce weight to ease operation. For stability, a removable second shelf rack may engage the first shelf rack using hooks, while a removable flatbed unit may engage the first shelf rack using notches. The second shelf rack provides more discrete storage locations, while the flatbed permits transportation of larger or heavier items. This versatility enhances the utility of the cart.

Figure 1:
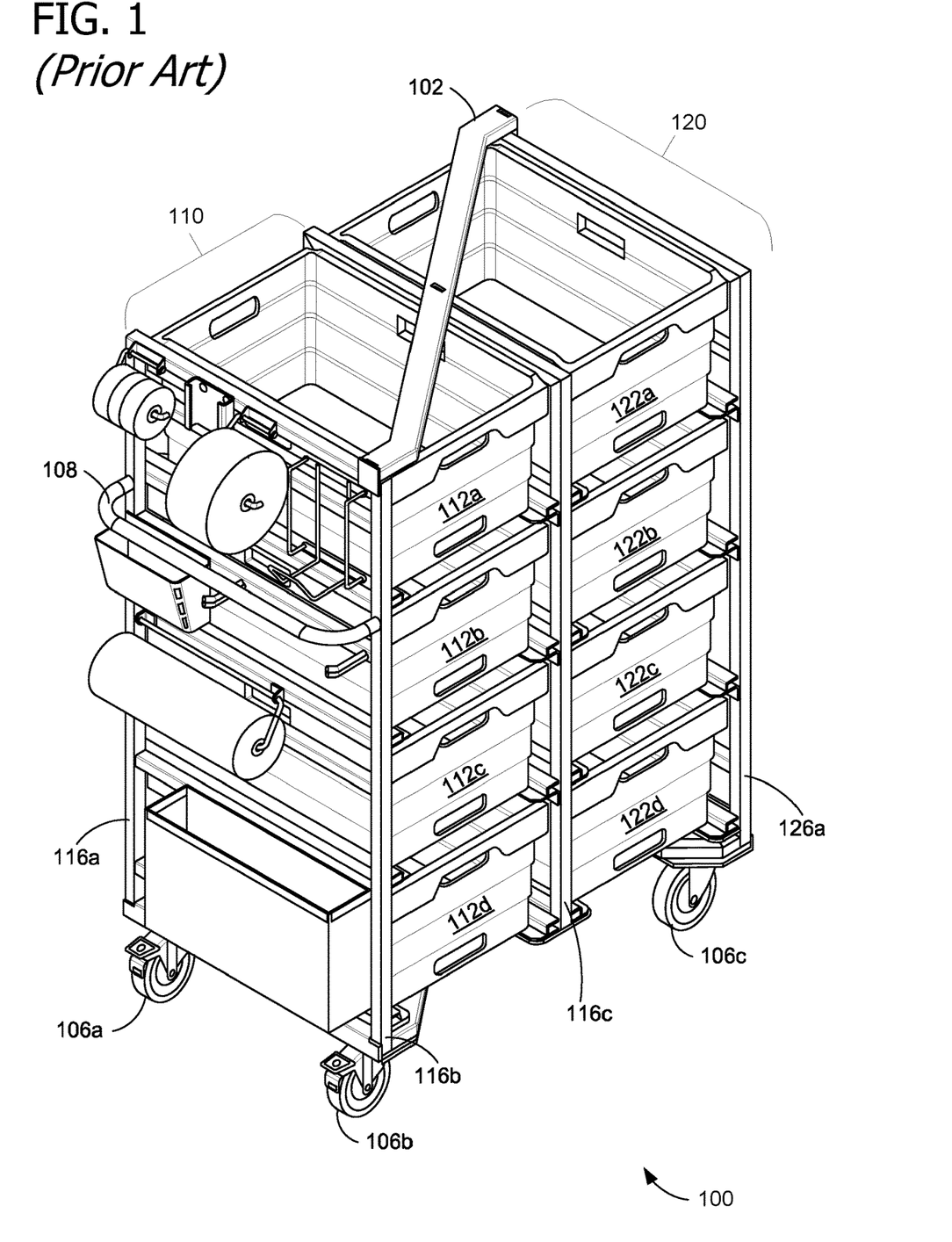
FIG. 1 illustrates a prior art pick cart.

FIG. 1 illustrates a prior art pick cart 100. Prior art pick cart 100 has two fixed-position shelf racks 110 and 120, along with a brace 102 that connects the top of shelf rack 110 with the top of shelf rack 120. Mobility of prior art pick cart 100 is enabled by wheels 106a, 106b, 106c, and a fourth wheel that is obscured in the perspective shown in FIG. 1. A handle 108 enables a user to maneuver prior art pick cart 100. Handle 108 is illustrated as being attached to vertical members 116a and 116b of shelf rack 110. Disposed opposite vertical members 116a and 116b is a vertical member 126a, and another vertical member that is obscured, and is disposed atop the obscured fourth wheel of prior art cart 100. A vertical member 116c is shared by shelf rack 110 and shelf rack 120. To hold items that may otherwise roll or slide off prior art cart 100, bins 112a, 112b, 112c, and 112d are located within shelf rack 110, and bins 122a, 122b, 122c, and 122d are located within shelf rack 120. Prior art cart 100 also has various attachment points for accessories.

Figure 2:
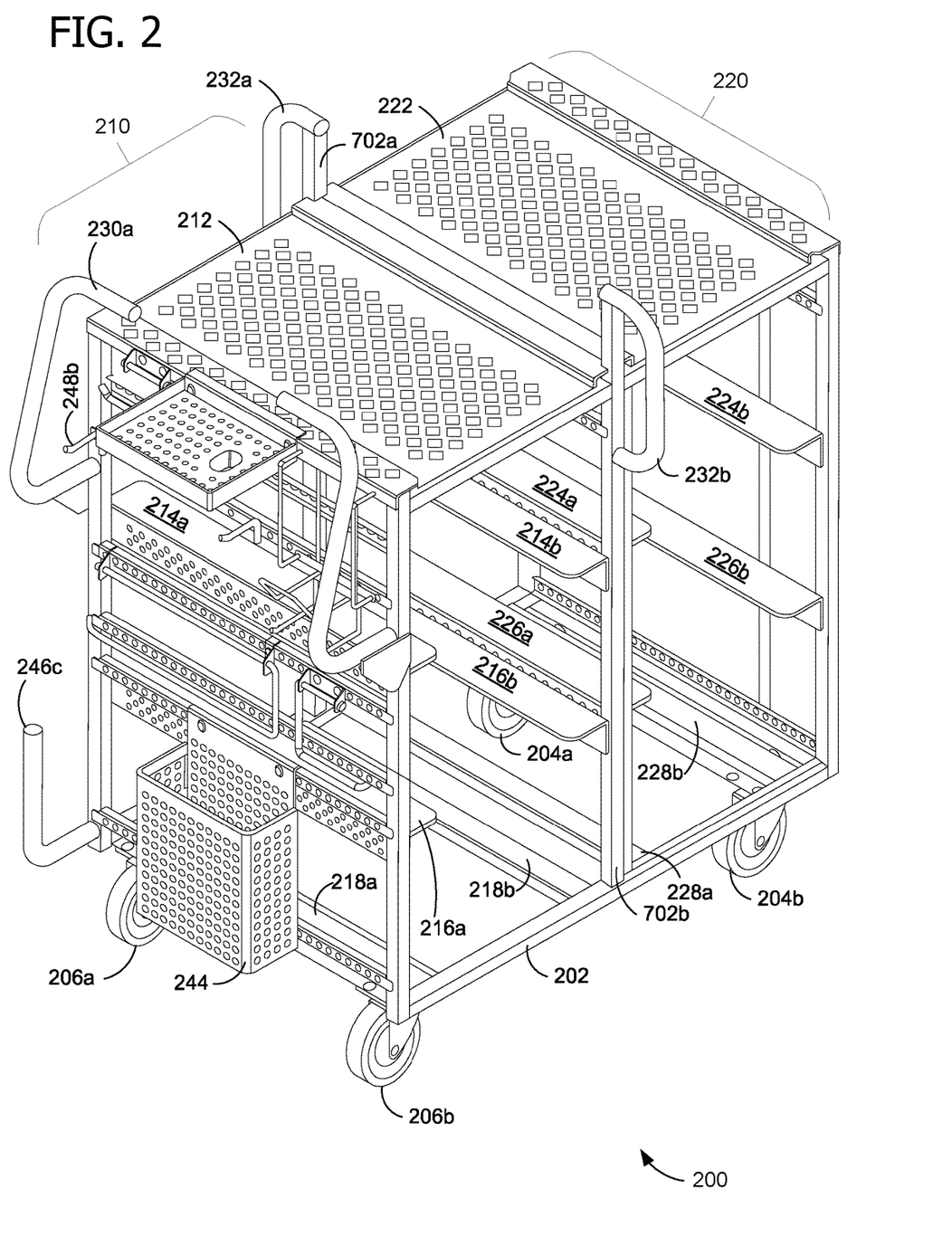
FIG. 2 illustrates an exemplary embodiment of a light weight pick cart.
Figure 3:
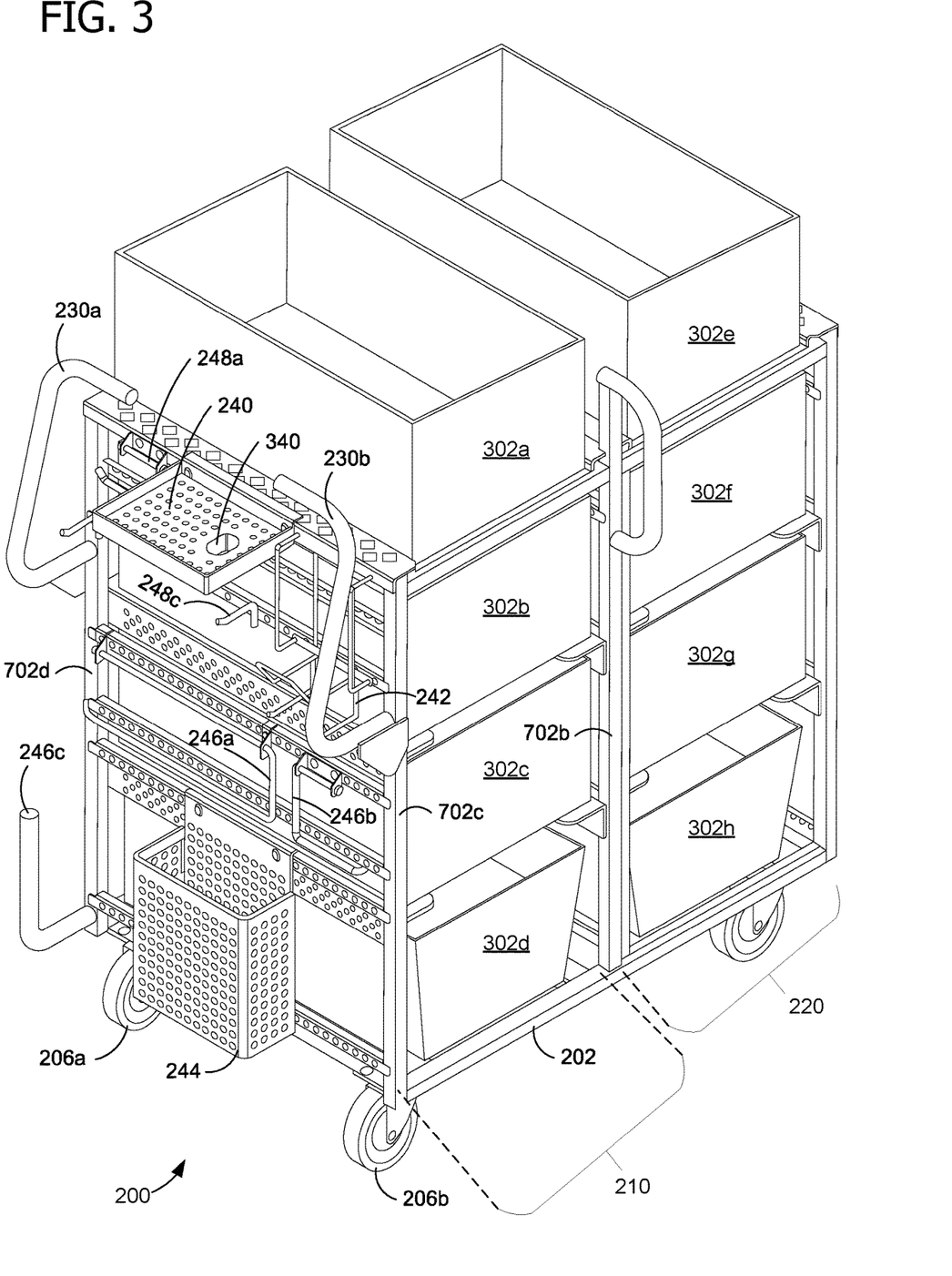
FIG. 3 illustrates an exemplary embodiment of a light weight pick cart with bins in the shelf racks.

FIG. 2 illustrates an exemplary embodiment of a light weight pick cart 200. FIG. 3 also illustrates cart 200, but with bins 302a-302h in shelf racks 210 and 220. FIGS. 2 and 3 should be viewed together, as some elements referenced may be visible or labeled in only one of FIG. 2 or FIG. 3. Cart 200 comprises a frame 202, a first shelf rack 210 that is attached to frame 202, and a second shelf rack 220 that is optionally removable from frame 202. For embodiments in which shelf rack 220 is removable, a flatbed unit 802 (see FIG. 8) may attach to the frame 202 in the place of shelf rack 220, adjacent to shelf rack 210. Such embodiments of cart 200 are convertible, and may alternate between a first configuration having two shelf racks 210 and 220 and a second configuration having both a shelf rack 210 and a flatbed 802.

Cart 200 fits the needs of the workers, including the ability to carry multiple tools and supplies, as well as move easily through aisles. In some embodiments, frame 202, shelf rack 210, and shelf rack 220 may be at least partially constructed of aluminum. Other components, such as handles, shelves, and accessory support units may also be at least partially constructed of aluminum. Reduced weight, relative to other carts of comparable dimensions and configured for similar uses, and improved maneuverability have the potential to improve worker efficiency. Some embodiments of cart 200 may be approximately 53 inches, and the total weigh may yet still be under 150 pounds. Some embodiments may use perforations wherever possible, in an attempt to maximize weight savings. Stronger materials may make greater use of perforations, whereas material that is not as strong may require reinforcement, closer spacing, and/or use of thicker components.

Shelf rack 210 comprises at least two pairs of vertical members 702a, 702b, 702c, and 702d. As illustrated, shelf rack 210 has four vertical shelf divisions, although a greater or lesser number may be used. A top shelf 212 of shelf rack 210 provides a flat surface for bulky items, such as bags of pet food, and may be perforated to reduce weight. In some embodiments, top shelf 212 may be made from 14 gauge steel, even if the remainder of shelf rack 210 comprises aluminum. The lower shelf divisions may be single flat pieces, or the split-rail shelf configuration shown. As illustrated, the next shelf down from top shelf 212 is comprised of two rails 214a and 214b. A tote 302b can sit on these two rails (214a and 214b), possibly sliding out laterally to permit access to items within tote 302b. The other shelves in shelf rack 210 are comprised of rails 216a and 216b (second shelf from the bottom) and rails 218a and 218b (bottom shelf).

As illustrated, shelf rack 220 is similarly configured for storage, although this is not necessary. A top shelf 222 of shelf rack 220 provides a flat surface for bulky items, and construction and configuration (including perforation) of top shelf 222 may be similar to that of top shelf 212. The lower shelf divisions may be single flat pieces, or the split-rail shelf configuration shown. The shelf rail pairs, from top to bottom are rails 224a and 224b, rails 226a and 226b, and also rails 228a and 228b (bottom shelf). As illustrated, cart 200 can hold a total of eight tote bins in two columns that are each four containers high. The sizes and shapes of the shelf divisions may be customized to accommodate various containers (e.g., totes) in use. As illustrated, bin 302a is on top shelf 212; bin 302b rests on rails 214a and 214b; bin 302c rests on rails 216a and 216b; bin 302d rests on rails 218a and 218b; bin 302e is on top shelf 222; bin 302f rests on rails 224a and 224b; bin 302g rests on rails 226a and 226b; and bin 302h rests on rails 228a and 228b.

Cart 210 uses at least four wheels 204a, 204b, 206a, and 206b, attached to frame 202. Each of wheels 204a, 204b, 206a, and 206b is disposed sufficiently nearby corners of frame 202 to prevent cart 210 from tipping. At least two of wheels 204a, 204b, 206a, and 206b may comprise swivel casters, although in some embodiments, all four of wheels 204a, 204b, 206a, and 206b may comprise swivel casters. More detail on the wheel configuration options is provided in the description of FIG. 4.

A first handle, illustrated as a two-part bull horn handle, having portions 230a and 230b, can be used to maneuver cart 210. A bull horn handle is curved in at least two dimensions to provide for a more comfortable grip, and may be either a single piece or be in separate portions. First handle portions 230a and 230b are attached to frame 202 through vertical members 702c, and 702d. Handle portion 230a is attached to vertical member 702d, and handle portion 230b is attached to vertical member 702c. A pair of secondary handles 232a and 232b are disposed (one each) on one of vertical members 702a and 702b. Secondary handle 232a is attached to vertical member 702a, and secondary handle 232b is attached to vertical member 702b. Secondary handles 232a and 232b permit cart 200 to be pushed and pulled from the side.

Multiple accessory support units 240, 242, 244, 246a, 246b, and 248a-248c are illustrated, although it should be understood that a different number or different set may be used. Accessory support units 240, 242, 244, 246a-246c, and 248a-248c are illustrated as being attached to shelf rack 210, although accessory support units may be attached to different portions of cart 210, including shelf rack 220. Accessory support units 240, 242, 244, 246a, 246b, and 248a-248c include multiple different configurations to provide support for a variety of different accessory shapes. These configurations include a flat shelf 240, baskets 242 and 244, and hooks (arms) 246a-246c. Additional accessory support units 248a-248c may include pegs and/or other custom configurations.

Shelf 240 may be perforated for weight savings, or may be a wire shelf. A hole 340 (not a mere perforation hole) in shelf 240 is sized to permit passage of the handle of a handheld scanner, so that the scanner may be set on shelf in the same orientation as it may be when being held be a person. Shelf 240 may optionally be configured as a tray, with raised edges, to permit items to be clipped on. Basket 242 is a wire frame basket, sized and shaped for an accessory, such as a portable label printer. The wire frame supports solid shapes and can provide weight savings. Basket 244 is a perforated basket that may be useful as a wastebasket, or for holding irregularly-shaped objects that would fall through a wire frame basket.

Hooks 246a-246c may be used for holding items dispensed form rolls, such as rolls of plastic bags, printer paper, or adhesive labels. As illustrated, hook 246b is the smallest, and 246a is larger; both of 246a and 246b are oriented horizontally. Hook 246c is both the largest, and is oriented vertically. A vertically-oriented hook may be used for heavier rolls that might cause horizontally-oriented hooks to bend or sag. Hooks 246a-246c can be sized according to the materials that a worker is expected to need while retrieving or stocking items. Some of the rolls of dispensed materials may include shopping bags, produce bags, meat bags, paper, and adhesive labels.

Figure 4:
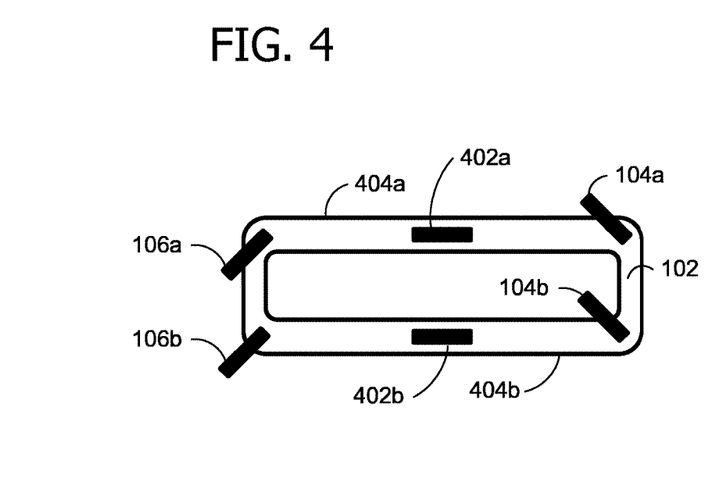
FIG. 4 illustrates an exemplary wheel configuration for a light weight pick cart.

FIG. 4 illustrates an exemplary wheel configuration for cart 200, as seen from above. Attached to frame 202 are wheels 204a, 204b, 206a, and 206b. As illustrated, each of wheels 204a, 204b, 206a, and 206b are swiveled by about 45 degrees, although it should be understood that in some embodiments, not all of wheels 204a, 204b, 206a, and 206b may be swivel. The wheels that do swivel may comprise swivel casters. Swivel casters may optionally lock to prevent swiveling, possibly at fixed angles (straight, 90 degrees), or arbitrary angles. A swivel lock is different than a wheel brake, any of wheels 204a, 204b, 206a, and 206b may have, independently of whether they swivel. Also, as illustrated, a fifth wheel 402a disposed on a first long edge 404a of frame 202 and a sixth wheel 402b is disposed on a second long edge 404b of frame 202, opposite the edge 404a. This six-wheel configuration, with non-swiveling center wheels 402a and 402b, enables easier in-place rotation to improve maneuverability. In the illustrated configuration, wheels 204a, 204b, 206a, 206b, 402a, and 402b are set for clockwise rotation (as viewed from above).

Figure 5:
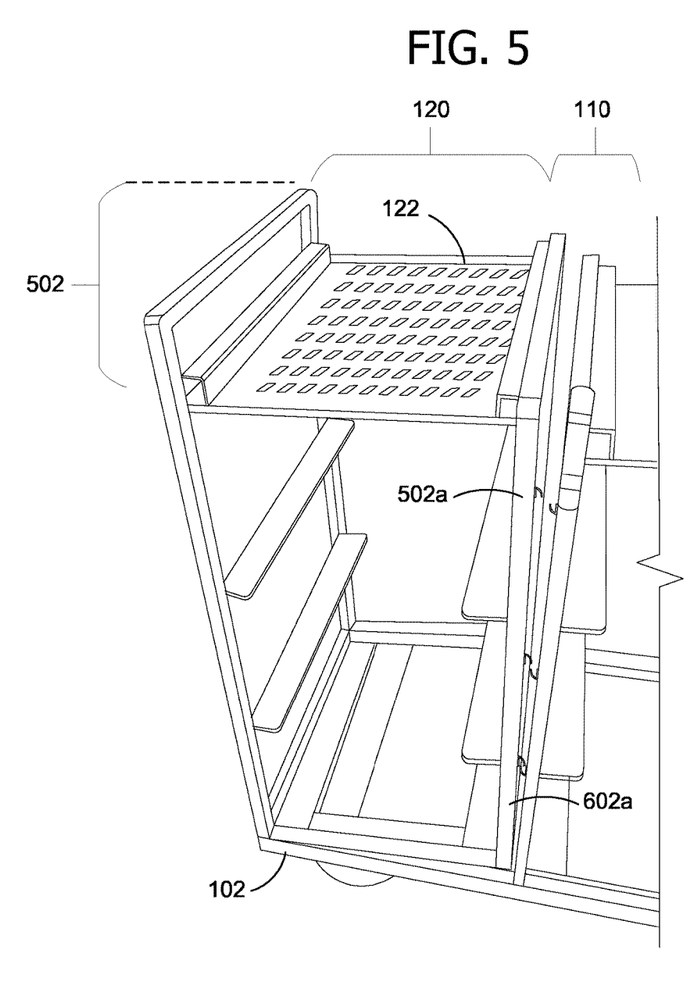
FIG. 5 illustrates an exemplary configuration change for a light weight pick cart.

FIG. 5 illustrates an exemplary configuration change for embodiments of cart 200 that have a removable shelf rack 220. As illustrated, shelf rack 220 is being installed, and is not yet fully in place. Shelf rack 220 is set onto frame 202, and may engage frame 202 with some alignment guide components of any configuration known in the art. Two vertical members of the second shelf rack 202 are labeled, and will be described in more detail with respect to FIG. 6. At the point in time that is illustrated, second shelf rack 202 has just engaged frame 202, but is not yet engaged with shelf rack 210. Also, as illustrated, an optional rail 502 on shelf rack 220 may help prevent spillage of items, such as bin 302e (of FIG. 3), from top shelf 222.

Figure 6:
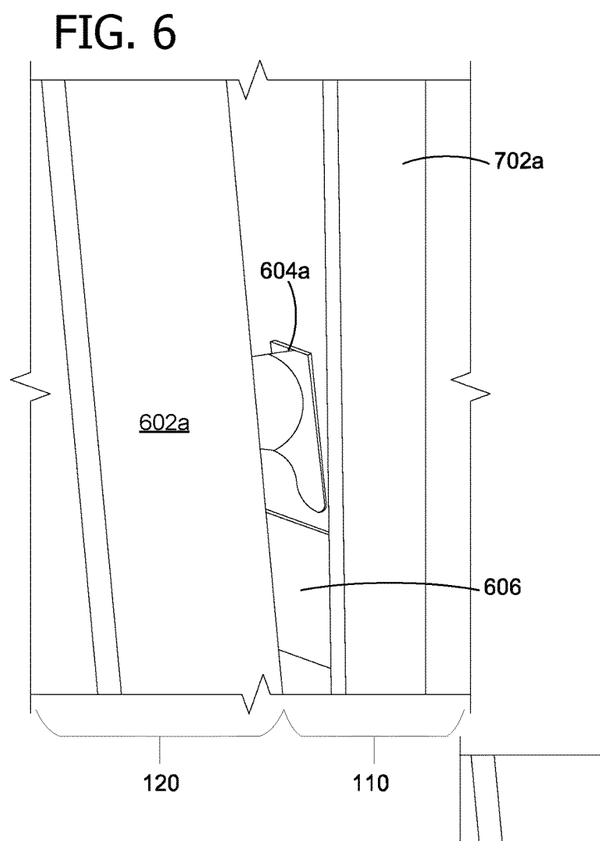
FIGS. 6 and 7 illustrate some details regarding configuration changes for exemplary light weight pick carts.

FIG. 6 illustrates some details regarding configuration changes for cart 200. In some embodiments of cart 200, each of vertical members 602a and 602b (not shown) of shelf rack 220 may comprises a hook. Thus, shelf rack 220 may comprise a pair of hooks, each of the hooks disposed on one the vertical members 602a or 602b (one of two pairs of vertical members of shelf rack 220). For clarity, only hook 604a on vertical member 602a is shown. In the illustrated embodiment, shelf rack 220 engages shelf rack 210 by hook 604a engaging a horizontal member 606 of shelf rack 210, that passes from vertical member 702a to vertical member 702b (not shown). For example, horizontal member 606 may be a portion of an inverted version of rail 214a, such as an angled piece with the vertical portion extending upward, rather than downward. It should be understood that, although two hooks are described, some embodiments may use a different number of hooks.

Figure 7:
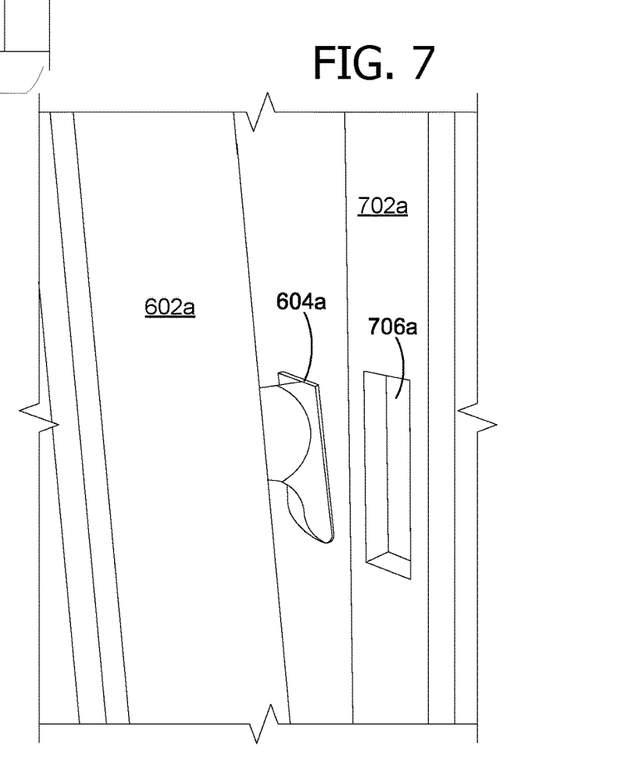

FIG. 7 illustrates some details regarding configuration changes for an alternative embodiment of cart 200. In this alternative embodiment, rather than hook 604a engaging a horizontal element, it may instead engage a slot 706a disposed on vertical member 702a of shelf rack 210. For clarity, only slot 706a and vertical member 702a are shown, although it should be understood that vertical member 702b (not shown) may also have an equivalent slot. It should also be understood that a different number of hooks and corresponding slots may be used. Thus, in this alternative embodiment, shelf rack 220 comprises a pair of slots (including slot 706a), wherein each of the slots is disposed on one vertical member (702a or 702b) of one pair of the two pairs of vertical members of shelf rack 220, wherein each of the slots (e.g., 706a) is configured to engage one of the hooks (e.g., 604a) of shelf rack 220.

Figure 8:
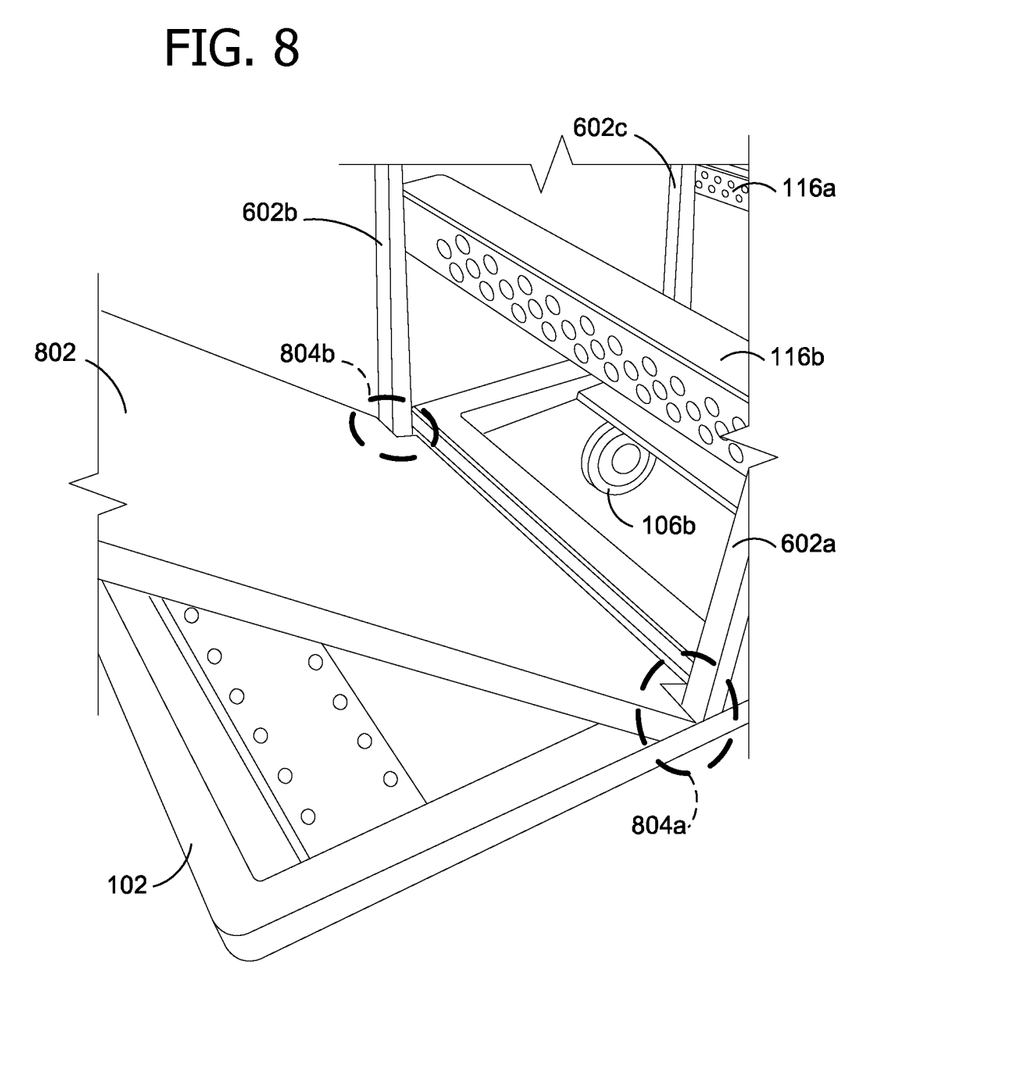
FIG. 8 illustrates another exemplary configuration change for a light weight pick cart.

FIG. 8 illustrates another exemplary configuration change for cart 200. As illustrated, removable flatbed unit 802 is being installed, and is not yet fully in place. Flatbed unit 802 is set onto frame 202 and engages shelf rack 210. In some embodiments, flatbed unit 802 has notches 804a and 804b at two corners that engage vertical elements 702a and 702b. That is each of notches 804a and 804b is configured to engage one vertical element 702a and 702b of one pair of the two pairs of vertical members of shelf rack 210. This operation aligns flatbed unit 802, so that when it is set down, it may properly engage frame 202. Alignment guides that are known in the art may be used to retain flatbed unit 802 in place on frame 202.

For example, flatbed unit 802 may be held in place by the use of bent flanges that wrap around frame 202. In some embodiments, a flatbed unit may be longer than the removable shelf rack it replaces. For example, if shelf rack 220 (of FIGS. 2 and 3) is approximately 14 inches from front to back (relative to the installed orientation), and flatbed unit 802 is approximately 24 inches, cart 200 will have its total length extended by approximately 10 inches when being changed from a configuration having two shelf racks (210 and 220) to a configuration having both a shelf rack 210 and a flatbed unit 802.

Figure 9:
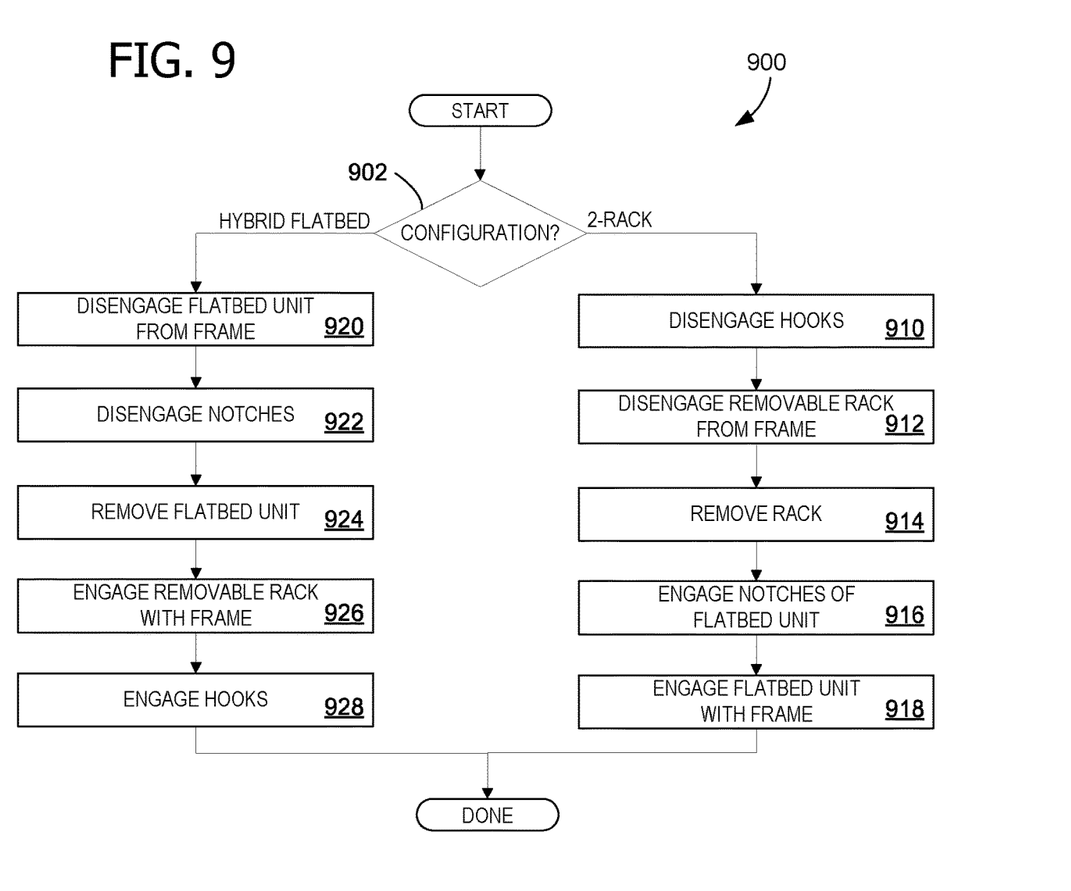
FIG. 9 illustrates a flow diagram for changing configurations for an exemplary light weight convertible pick cart.

FIG. 9 illustrates a flow diagram 900 for changing configurations for some embodiments of cart 200. Flow diagram 900 should be viewed along with FIGS. 2, 5, 6 and 8. In decision operation 902, it is determined whether cart 200 is in the two-rack configuration or the hybrid single rack and flatbed configuration. Responsive to cart 200 being in the configuration of having two shelf racks, cart 200 may be changed to the configuration having both a shelf rack and a flatbed through operations 910-918. Operation 910 is to disengage hooks of removable shelf rack 220 from shelf rack 210. Operation 912 is to disengage shelf rack 220 from frame 202. Operation 914 is to remove shelf rack 220 from cart 200. Operation 916 is to engage notches of flatbed unit 802 with shelf rack 210. Operation 918 is to engage flatbed unit 802 with frame 202. Cart 200 is now in the (hybrid) flatbed configuration.

However, in decision operation 902, it may have been determined that cart 200 is in the hybrid single rack and flatbed configuration. Responsive to cart 200 being in the configuration of having both a shelf rack and a flatbed, cart 200 may be changed to the configuration having two shelf racks through operations 920-928. Operation 920 is to disengage flatbed unit 802 from frame 202. Operation 922 is to disengage notches of flatbed unit 802 from shelf rack 210. Operation 924 is to remove flatbed unit 802 from cart 200. Operation 926 is to engage hooks of removable shelf rack 220 with frame 202, such as by engaging a horizontal member or slots of shelf rack 210. Operation 928 is to engage hooks of shelf rack 220 with shelf rack 210. Cart 200 is now in the two shelf rack configuration.

Exemplary Operating Methods and Systems

An exemplary light weight pick cart may comprise: a first shelf rack comprised of aluminum and attached to the frame, the first shelf rack having at least two pairs of vertical members and at least three vertical shelf divisions, wherein a top shelf of the first shelf rack provides a perforated flat surface; a second shelf rack comprised of aluminum and attached to the frame, the second shelf rack having at least two pairs of vertical members and at least three vertical shelf divisions, wherein a top shelf of the second shelf rack provides a perforated flat surface; a first handle attached to the frame through a first pair of the two pairs of vertical members of the first shelf rack, wherein the first handle is curved in at least two dimensions; a pair of secondary handles, each of the of secondary handles disposed on one vertical member of a second pair of the two pairs of vertical members of the first shelf rack, wherein each of the of secondary handles is curved in at least one dimension; at least five accessory support units attached to the first shelf rack, the five accessory support units having at least three different configurations, wherein at least one of the five accessory support units comprises a flat shelf having at least one hole, wherein at least one of the five accessory support units comprises a basket, wherein at least one of the five accessory support units comprises a first hook of a first size and disposed in a first orientation, and wherein at least one of the five accessory support units comprises a second hook differing from the first hook in either size or orientation; at least four wheels attached to the frame, each of the four wheels disposed nearby a corner of the frame, wherein at least two wheels of the four wheels comprise swivel casters.

An exemplary light weight pick cart may comprise: a frame; a first shelf rack attached to the frame, the first shelf rack having at least two pairs of vertical members and at least three vertical shelf divisions, wherein a top shelf of the first shelf rack provides a flat surface; a first handle attached to the frame; at least five accessory support units attached to the first shelf rack, the five accessory support units having at least three different configurations; at least four wheels attached to the frame, each of the four wheels disposed nearby a corner of the frame, wherein at least two wheels of the four wheels comprise swivel casters; a removable second shelf rack, the second shelf rack having at least two pairs of vertical members and at least three vertical shelf divisions, wherein a top shelf of the second shelf rack provides a flat surface; and a removable flatbed unit, wherein the second shelf rack and the flatbed unit may alternately attach to the frame adjacent to the first shelf rack such that the cart is convertible between a first configuration having two shelf racks and a second configuration having both a shelf rack and a flatbed.

An exemplary method for converting a light weight pick cart between a first configuration having two shelf racks and a second configuration having both a shelf rack and a flatbed may comprise: responsive to the cart being in the first configuration: disengaging hooks of a second shelf rack from a first shelf rack; disengaging the second shelf rack from a frame of the cart; removing the second shelf rack from the cart; engaging notches of a flatbed unit with first shelf rack; and engaging the flatbed unit with the frame of the cart; and responsive to the cart being in the second configuration: disengaging the flatbed unit from the frame of the cart; disengaging the notches of the flatbed unit from the first shelf rack; removing the flatbed unit from the cart; engaging the second shelf rack with the frame of the cart; and engaging the hooks of the second shelf rack with the first shelf rack.

Alternatively, or in addition to the other examples described herein, examples include any combination of the following:
- the top shelf of the first shelf rack and the top shelf of the second shelf are perforated;
- the first handle is attached to the frame through a first pair of the two pairs of vertical members of the first shelf rack;
- the first handle is curved in at least two dimensions;
- a pair of secondary handles, each of the of secondary handles disposed on one vertical member of a second pair of the two pairs of vertical members of the first shelf rack, wherein each of the of secondary handles is curved in at least one dimension;
- at least one of the five accessory support units comprises a flat shelf having at least one hole;
- at least one of the five accessory support units comprises a basket;
- the basket comprises a wire frame basket;
- at least one of the five accessory support units comprises a first hook of a first size and disposed in a first orientation;
- at least one of the five accessory support units comprises a second hook differing from the first hook in either size or orientation;
- at least four wheels comprise swivel casters;
- at least two of the swivel casters are lockable to prevent swiveling;
- a fifth wheel disposed on a first long edge of the frame and a sixth wheel disposed on a second long edge of the frame, opposite the first long edge of the frame;
- the second shelf rack comprises a pair of hooks, each of the hooks disposed on one vertical member of a first pair of the two pairs of vertical members of the second shelf rack;
- the first shelf rack comprises a pair of slots, each of the slots disposed on one vertical member of a second pair of the two pairs of vertical members of the first shelf rack, wherein each of the slots is configured to engage one of the hooks of the second shelf rack;
- the flatbed unit comprises a pair of notches, each of the notches configured to engage one vertical member of a second pair of the two pairs of vertical members of the first shelf rack;
- the weight of the cart in the first configuration is below 150 pounds; and
- the frame, the first shelf rack, and the second shelf rack are comprised of aluminum.

The examples illustrated and described herein as well as examples not specifically described herein but within the scope of aspects of the disclosure constitute an exemplary entity-specific value optimization environment. The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term 'exemplary is intended to mean 'an example of. The phrase 'one or more of the following: A, B, and C means 'at least one of A and/or at least one of B and/or at least one of C.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

While the disclosure is susceptible to various modifications and alternative constructions, certain illustrated examples thereof are shown in the drawings and have been described above in detail. It should be understood, however, that there is no intention to limit the disclosure to the specific forms disclosed, but on the contrary, the intention is to cover all modifications, alternative constructions, and equivalents falling within the spirit and scope of the disclosure.

What is claimed is:

1. A light weight pick cart comprising:
   a frame;
   a first shelf rack attached to the frame, the first shelf rack having at least two pairs of vertical members and at least three vertical shelf divisions;
   a perforated top shelf of the first shelf rack that provides a perforated fixed-position flat surface without raised edges at the top of the light weight pick cart;
   a first handle attached to the frame through a first pair of the at least two pairs of vertical members of the first shelf rack;
   a pair of secondary handles, each of the pair of secondary handles disposed on one vertical member of a second pair of the at least two pairs of vertical members of the first shelf rack, wherein each of the pair of secondary handles is curved in at least one dimension;
   at least five accessory support units attached to the first shelf rack, the five accessory support units having at least three different configurations;
   at least four wheels attached to the frame, each of the four wheels disposed nearby a corner of the frame, wherein at least two wheels of the four wheels comprise swivel casters;
   a removable second shelf rack, the second shelf rack having at least two other pairs of vertical members and at least three other vertical shelf divisions, wherein a perforated top shelf of the second shelf rack provides a second perforated fixed-position flat surface, and wherein at least one other pair of vertical members of the at least two other pairs of vertical members of the removable second shelf rack is attached to the frame along the plane of at least one pair of vertical members of the at least two pairs of vertical members of the first shelf rack; and a removable flatbed unit,
wherein the second shelf rack and the removeable flatbed unit may alternately attach to the frame adjacent to the first shelf rack such that the light weight pick cart is convertible between a first configuration having the first shelf rack and the removable second shelf rack and a second configuration having the first shelf rack and the removable flatbed unit.

2. The light weight pick cart of claim 1 wherein the first handle is attached to the frame through a first pair of the two pairs of vertical members of the first shelf rack.

3. The light weight pick cart of claim 2 wherein the first handle is curved in at least two dimensions.

4. The light weight pick cart of claim 1 wherein at least one of the five accessory support units comprises a flat shelf having at least one hole.

5. The light weight pick cart of claim 1 wherein at least one of the five accessory support units comprises a perforated wire frame basket.

6. The light weight pick cart of claim 1 wherein at least one of the five accessory support units comprises a first hook of a first size and disposed in a first orientation.

7. The light weight pick cart of claim 6 wherein at least one of the five accessory support units comprises a second hook differing from the first hook in either size or orientation.

8. The light weight pick cart of claim 1 wherein the at least four wheels comprise swivel casters.

9. The light weight pick cart of claim 1 wherein the swivel casters are lockable to prevent swiveling.

10. The light weight pick cart of claim 1 further comprising a fifth wheel disposed on a first long edge of the frame and a sixth wheel disposed on a second long edge of the frame, opposite the first long edge of the frame.

11. The light weight pick cart of claim 1 wherein the second shelf rack comprises a pair of hooks, each of the hooks disposed on one vertical member of a first pair of the two pairs of vertical members of the second shelf rack.

12. The light weight pick cart of claim 1 wherein the first shelf rack comprises a pair of slots, each of the slots disposed on one vertical member of a second pair of the two pairs of vertical members of the first shelf rack, wherein each slot is configured to engage one of the hooks of the second shelf rack.

13. The light weight pick cart of claim 1 wherein the removable flatbed unit comprises a pair of notches, each notch of the pair of notches configured to engage one vertical member of a second pair of the two pairs of vertical members of the first shelf rack.

14. The light weight pick cart of claim 1 wherein the weight of the cart in the first configuration is below 150 pounds.

15. The light weight pick cart of claim 1 wherein the frame, the first shelf rack, and the second shelf rack are comprised of aluminum.

16. A light weight pick cart comprising:
a frame comprised of aluminum;
a first shelf rack comprised of aluminum and attached to the frame, the first shelf rack having at least two pairs of vertical members and at least three vertical shelf divisions;
a perforated top shelf of the first shelf rack that provides a perforated fixed-position flat surface without raised edges at the top of the light weight pick cart;
a removable second shelf rack comprised of aluminum and attached to the frame, the removable second shelf rack having at least two other pairs of vertical members and at least three other vertical shelf divisions, wherein a top shelf of the second shelf rack provides a second perforated fixed-position flat surface, and wherein at least one other pair of vertical members of the at least two other pairs of vertical members of the removable second shelf rack is attached to the frame along the plane of at least one pair of vertical members of the at least two pairs of vertical members of the first shelf rack;
a first handle attached to the frame through a first pair of the at least two pairs of vertical members of the first shelf rack, wherein the first handle is curved in at least two dimensions;
a pair of secondary handles, each of the of secondary handles disposed on one vertical member of a second pair of the at least two pairs of vertical members of the first shelf rack, wherein each of the of secondary handles is curved in at least one dimension;
at least five accessory support units attached to the first shelf rack, the five accessory support units having at least three different configurations,
wherein at least one of the five accessory support units comprises a flat shelf having at least one hole,
wherein at least one of the five accessory support units comprises a basket,
wherein at least one of the five accessory support units comprises a first hook of a first size and disposed in a first orientation, and
wherein at least one of the five accessory support units comprises a second hook differing from the first hook in either size or orientation;
at least four wheels attached to the frame, each of the four wheels disposed nearby a corner of the frame, wherein at least two wheels of the four wheels comprise swivel casters.

* * * * *